(12) United States Patent
Kwan et al.

(10) Patent No.: US 7,018,122 B2
(45) Date of Patent: Mar. 28, 2006

(54) SINGLE- OR DOUBLE-ENDED MULTI-SECTION NIB MARKER

(75) Inventors: Vincent W. Kwan, Chicago, IL (US); Jennifer Carra, Bolingbrook, IL (US)

(73) Assignee: Sanford, L.P., Freeport, IL (US)

( * ) Notice: Subject to any disclaimer, the term of this patent is extended or adjusted under 35 U.S.C. 154(b) by 0 days.

(21) Appl. No.: 10/954,783

(22) Filed: Sep. 30, 2004

(65) Prior Publication Data

US 2005/0226675 A1    Oct. 13, 2005

Related U.S. Application Data

(60) Provisional application No. 60/560,153, filed on Apr. 7, 2004.

(51) Int. Cl.
*B43K 27/04* (2006.01)

(52) U.S. Cl. .............................. 401/35; 401/34; 401/28

(58) Field of Classification Search ................... 401/34, 401/35, 28
See application file for complete search history.

(56) References Cited

U.S. PATENT DOCUMENTS

| | | | | |
|---|---|---|---|---|
| 1,938,835 A | | 12/1933 | Grzyb ......................... 120/42 |
| 1,977,527 A | | 10/1934 | Pohle .......................... 120/42 |
| 3,077,184 A | * | 2/1963 | Vogel .......................... 401/34 |
| 3,093,113 A | | 6/1963 | Reynoso ................... 120/42.16 |
| 3,684,389 A | | 8/1972 | Eron et al. .................. 401/207 |
| 3,765,780 A | | 10/1973 | Guu et al. ..................... 401/17 |
| 3,887,287 A | * | 6/1975 | Rosh, Jr. ...................... 401/35 |
| 3,917,416 A | * | 11/1975 | Steyer ......................... 401/34 |
| D279,992 S | | 8/1985 | Gribb ......................... D19/43 |
| 4,597,932 A | | 7/1986 | Kurihara et al. ............. 264/145 |
| 4,761,089 A | | 8/1988 | Kurihara et al. ............. 401/198 |
| 4,770,557 A | | 9/1988 | Pitts ........................... 401/193 |
| 4,838,723 A | | 6/1989 | Suzuki et al. ................ 401/199 |
| D306,316 S | | 2/1990 | Shintani ...................... D19/36 |
| D312,658 S | | 12/1990 | Sumino ....................... D19/36 |
| 4,981,516 A | | 1/1991 | Kluger et al. ................. 106/22 |

(Continued)

FOREIGN PATENT DOCUMENTS

EP    0564666    10/1993

(Continued)

OTHER PUBLICATIONS

International Search Report for PCT/US2005/002607 dated Aug. 10, 2005.

(Continued)

*Primary Examiner*—Khoa D. Huynh
(74) *Attorney, Agent, or Firm*—Marshall, Gerstein & Borun LLP

(57) ABSTRACT

A writing instrument comprising a tubular, ink-impermeable body portion containing a plurality of reservoirs that are housed adjacent to each other wherein each reservoir is separated from an adjacent reservoir by a reservoir barrier; a multi-sectioned nib disposed at one end of the writing instrument, said nib comprising a plurality of nib sections disposed adjacent to each other and separated from an adjacent nib section by a nib section barrier at a writing end, wherein the nib sections are secured adjacent to each other, and separated by said nib section barrier at one end thereof to form a writing end of the writing instrument, such that the nib sections do not communicate materials contained therein between adjacent nib sections, and wherein opposite ends of the nib section are spaced from each other and disposed within the tubular body portion such that each nib section is disposed in communication with a different reservoir.

3 Claims, 4 Drawing Sheets

U.S. PATENT DOCUMENTS

| | | | |
|---|---|---|---|
| 5,043,013 A | 8/1991 | Kluger et al. | 106/22 |
| 5,059,244 A | 10/1991 | King et al. | 106/21 |
| D336,425 S | 6/1993 | Napora, Jr. | D9/338 |
| 5,306,092 A * | 4/1994 | Jenq | 401/35 |
| 5,368,405 A * | 11/1994 | Sixiong | 401/35 |
| 5,388,924 A * | 2/1995 | Chao | 401/35 |
| 5,971,643 A | 10/1999 | Ahmed | 401/44 |
| D422,308 S | 4/2000 | Chuang | D19/36 |
| D452,753 S | 1/2002 | Look | D28/4 |
| D462,989 S * | 9/2002 | Hung | D19/43 |
| 6,491,464 B1 | 12/2002 | Young | 401/35 |
| 6,524,382 B1 | 2/2003 | Bujard et al. | 106/493 |
| 6,554,517 B1 | 4/2003 | Ahmed | 401/35 |
| 6,685,373 B1 | 2/2004 | Liu | 401/35 |
| 2003/0075201 A1 | 4/2003 | Saito | 132/320 |

FOREIGN PATENT DOCUMENTS

| | | |
|---|---|---|
| FR | 481028 | 3/1942 |
| GB | 651387 | 3/1951 |
| WO | WO 01/15912 | 3/2001 |

OTHER PUBLICATIONS

Written Opinion of International Search Report for PCT/US2005/002607 dated Aug. 10, 2005.

* cited by examiner

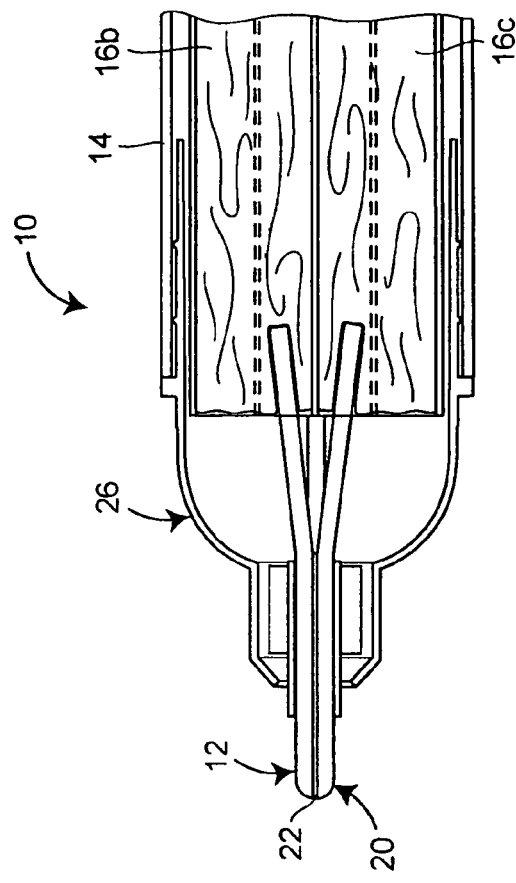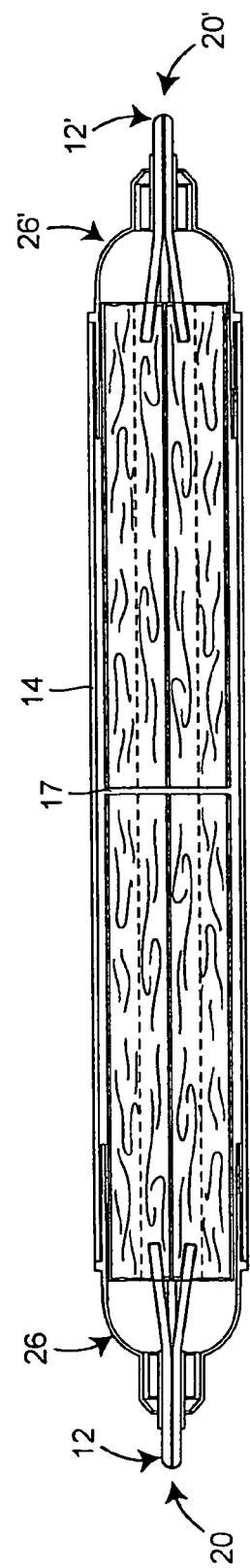

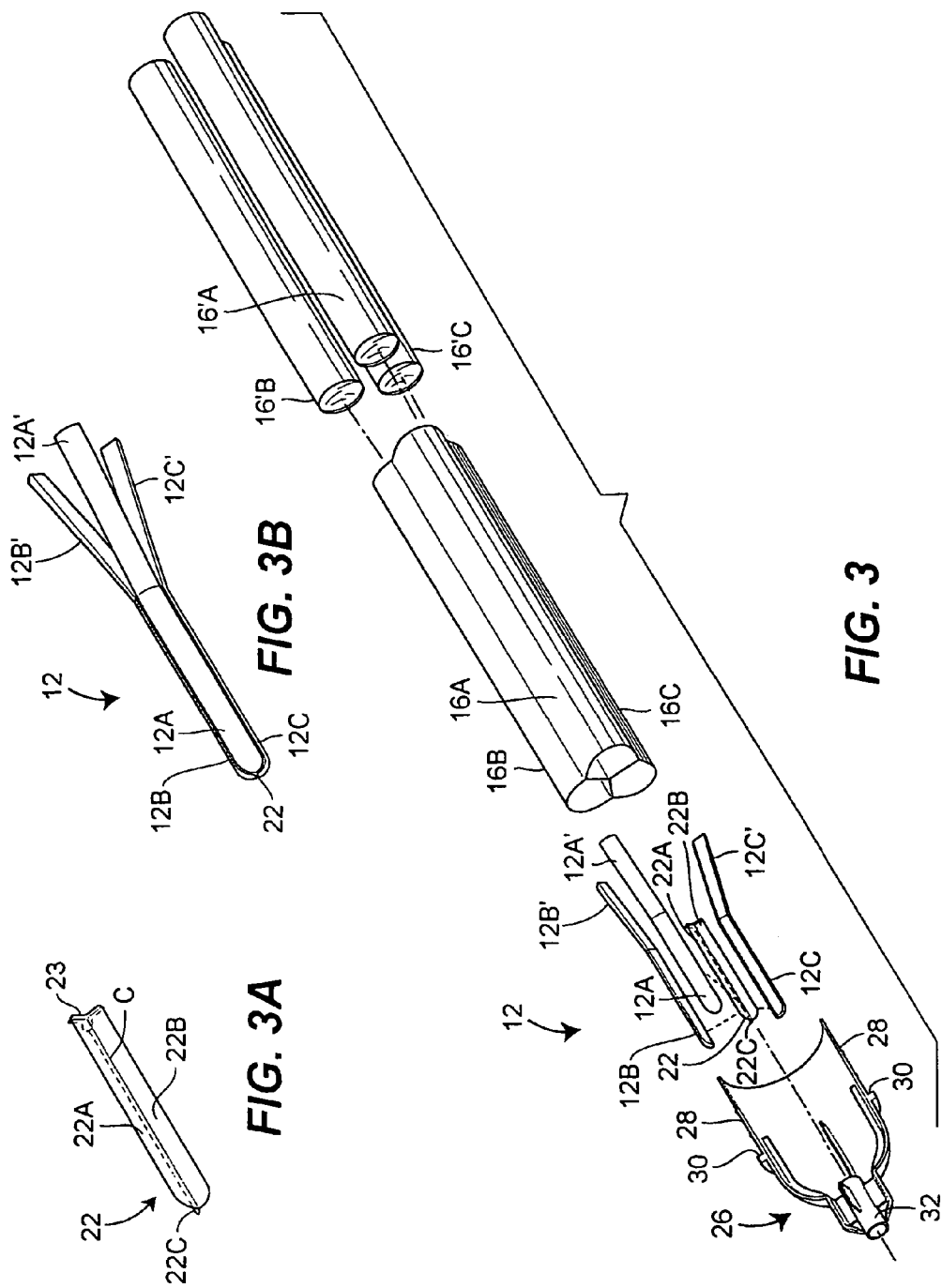

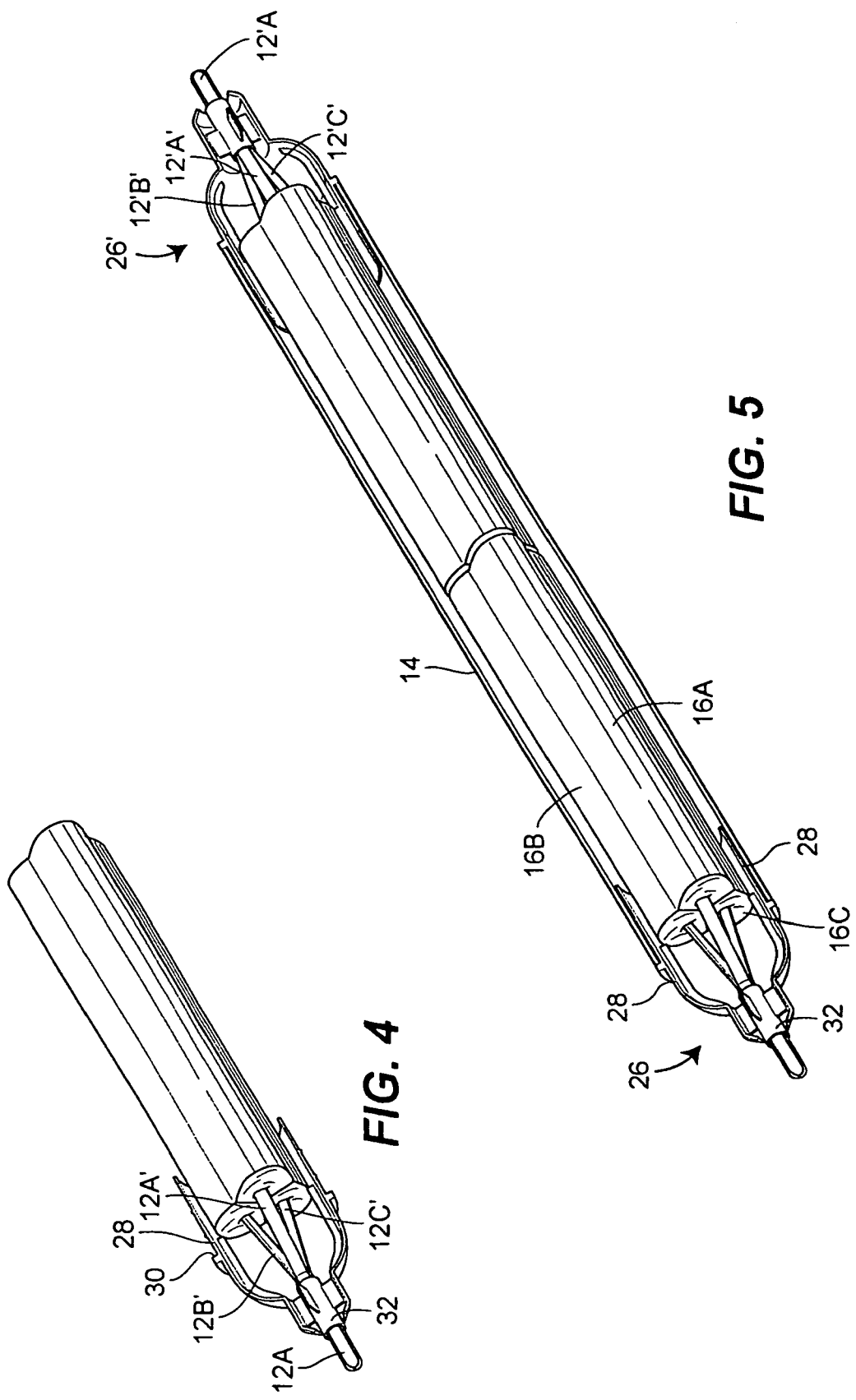

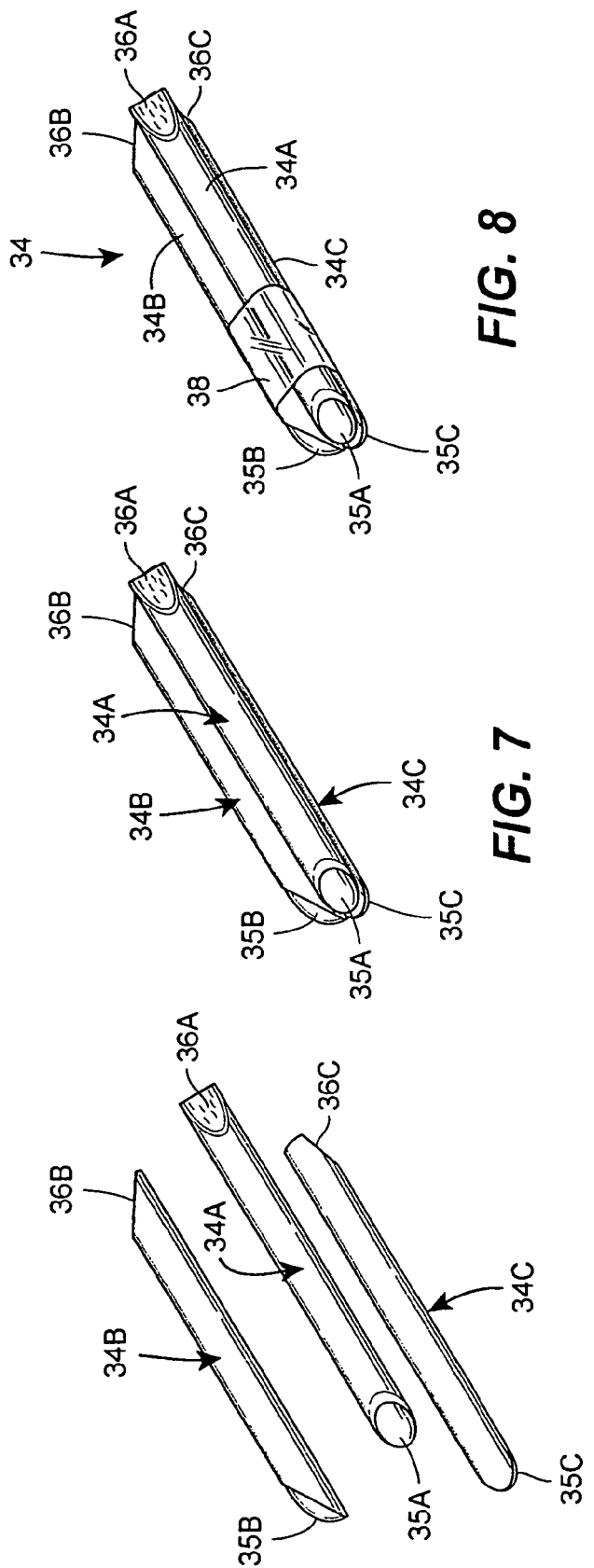

SINGLE- OR DOUBLE-ENDED MULTI-SECTION NIB MARKER

CROSS-REFERENCE TO RELATED APPLICATION

This application is a non-provisional patent application based on provisional patent application Ser. No. 60/560,153 filed Apr. 7, 2004.

FIELD OF THE INVENTION

The present invention is directed to writing or marking instruments having a plurality of fluid-containing, e.g., ink-containing, reservoirs, each in fluid communication with a distinct marker nib section so that each nib section delivers an ink or other fluid, e.g., erasing or white-out liquid or emulsion, from a different fluid-containing reservoir. In a preferred embodiment, each reservoir contains an ink of a different color. More particularly, the preferred embodiment of the writing instruments described herein includes a nib having three distinct sections disposed at each end of the writing instrument, each in fluid communication with a different fluid-containing reservoir, to provide a writing instrument capable of delivering materials, e.g., six different color inks or dyes, from six distinct reservoirs, and having the capability of delivering written traces of multiple materials, e.g., multiple colors, in a single stroke of the writing instrument.

BACKGROUND AND PRIOR ART

The requirements for capabilities of writing or marking instruments have changed considerably throughout the years. Markers or pens were used primarily in the past as writing instruments and were capable of delivering only a single ink. However the state of the art has become much more diverse and writing instrument users, particularly children, are attracted by unique, multi-functional markers or pens, such as those described herein that are capable of delivering a plurality of fluids, e.g., inks of different colors, either separately or simultaneously.

Most prior art writing instruments, for example, conventional ball-point pens, produce only a single color written trace. People, especially children, are fascinated by colors. Therefore, writing instruments capable of producing written traces of multiple colors have been designed, for example, to encourage children to develop motor and writing skills. Multi-color pens that use an array of ink containers of different colors arranged within or around the periphery of a thick pen barrel, such as those described in U.S. Pat. Nos. 1,938,835; 3,765,780; and 6,685,373. Despite its functionality, the pen barrels are so thick that it is not easy for the small hand of a child to get a firm grip on it. Additionally, in order to change colors, the user must retract the refill in use and extend another refill. Therefore, the pens are difficult to use, especially for young children. Moreover, each written trace produced by such pens constitutes a single ink composition and is therefore uniformly patterned throughout the written trace. On the other hand, the Swirl™ crayons deliver multi-color traces that are not controllable. In addition, there are pencils (Confetti Pencils by Colorific, Sanford Corporation, Bellwood, Ill.) and multi-color gel pens on the market. These products suffer from the same shortcoming in that the color combination is not controllable.

Crayons that deliver multi-colored written traces have been developed. For example, Sanford Corporation L.P. (Bellwood, Ill.) produces Colorific® Splitz™ and Colorific® Swirl™ crayons, which deliver confetti and block patterned multi-colored written traces, respectively. Such crayons are well-received by children (and their teachers) because the produced written trace includes multiple colors, and the colors of the written trace can change as the user makes a written mark across a substrate such as paper.

However, multi-color markers are not common. Sanford Corporation manufactured a double-ended marker that can produce traces of a different color from each marker end. U.S. Pat. No. 3,887,287 describes a multi-color marking implement having a plurality of flat-faced, adjacent marking nibs communicating with a plurality of nib-wicks, containing inks of different colors. However, because each nib is squared and contains a flat end surface, only one nib at a time can be used to mark a substrate.

Hence, there is a desire to develop a marking/writing instrument that can apply multiple materials to a substrate surface, such as different color inks, opaque inks and highlighter (transparent colored) inks, opaque, cover-up inks (e.g., white-out), dry erase ink, and any combination thereof in a controllable manner.

A single, multi-functional marking/writing instrument containing a multi-sectional, round nib writing end relieves the burden of parents in carrying multiple color markers for their children. In other words, if a marker can produce different color traces in a controllable fashion, a parent may only need to carry one marker instead of a whole bundle of markers each of a single color.

All these needs are met by the multi-fluid delivery markers described herein.

SUMMARY

The preferred embodiment of the marker described herein comprises two tri-sectored nibs attached to a single marker barrel, one at each end. At each of these tri-sectored nibs, there are three distinct, separate color-containing reservoirs that are in constant, intimate contact with the three individual, fluid-separated sectors of the nib. Altogether, the marker can allow up to six colors to be delivered by a single marker (three at each end). The porosity of the nib as well as the reservoir can be adjusted depending on the type of inks used in the marker. By rotating the marker by 120 degrees, the user can choose to write only one color. By continually rotating the marker while writing, a user can produce lines with consecutive color traces tied back to back.

The inks are also formulated so that they would not be inter-mixed for a prolonged period of time inside the nib. A pigmented ink is preferred.

Regarding functionality, the inks used can be both non-functional (just like common pigmented ink or glitter ink that provide visual effects only) or functional (inks like dry erase ink or highlighter ink or permanent ink that offer additional properties besides color).

BRIEF DESCRIPTION OF THE DRAWINGS

FIG. 1 is an enlarged, partially broken-away cross-sectional view of a writing/marking instrument containing a plurality of material reservoirs each in fluid communication with a separate section of a writing/marking nib, each nib section having a smooth, arced (rounded) writing end;

FIG. 2 is an enlarged, cross-sectional view of a writing/marking instrument containing a plurality of material reservoirs each in fluid communication with a separate section of a writing/marking nib having multi-sectional nibs at each end of the writing/marking instrument;

FIG. 3 is an exploded, perspective view of a portion of the writing/marking instrument of FIG. 2;

FIG. 3A is an enlarged, perspective view of a nib section barrier;

FIG. 3B is an enlarged, perspective view of a tri-sectioned nib adhered to the nib section barrier of FIG. 3A forming a rounded writing/marking end of the writing/marking instrument;

FIG. 4 is an enlarged, partially broken-away perspective view of a portion of the writing/marking instrument showing the tri-sectioned nib held in position at a writing/marking end, and showing each nib section in fluid communication with a separate fluid absorbent or nib-wick material;

FIG. 5 is an enlarged, partially broken-away perspective view of the writing/marking instrument shown in FIG. 2;

FIG. 6 is an exploded, perspective view of sections of another nib embodiment, wherein each nib section is individually wrapped with a fluid-impermeable polymeric film material;

FIG. 7 is a perspective view showing the nib sections of the FIG. 6 nib embodiment disposed adjacent to each other; and FIG. 8 is a perspective view of the adjacent nib section of FIG. 7 bound together, near the writing/marking end, with a tape or sleeve material.

DETAILED DESCRIPTION OF THE PREFERRED EMBODIMENTS

Turning now to the drawings, and initially to FIGS. 1 and 2, there is shown a multi-nib marker, generally designated by reference number 10, having a multi-sectioned nib 12 extending from one end of a marker barrel or housing 14. In the preferred embodiment shown in FIGS. 2 and 5, the marker includes multi-sectioned marking nibs, 12 and 12', extending from both ends of the marker barrel 14. In the preferred embodiment, each multi-sectioned nib 12 includes three identical sections 12A, 12B and 12C, each in fluid communication with a different fluid-containing reservoir 16A, 16B and 16C, respectively. Similarly, on the opposite writing end 20' of the marker 10, the other tri-sectioned nib 12' includes three nib sections 12'A, 12'B and 12'C in fluid communication with fluid reservoirs 16'A, 16'B and 16'C to form a marker 10 capable of delivering six separate fluids, e.g., inks,—one fluid from each section of the nibs 12 and 12'. Fluid reservoirs 16A, 16B and 16C are separated from fluid reservoirs 16'A, 16'B and 16'C by space 17 (FIG. 2) or by providing an ink-impermeable barrier therebetween.

In accordance with a preferred embodiment, the fluid reservoirs 16A, 16B, 16C, 16'A, 16'B and 16'C (best shown in FIG. 3) are formed from fibrous porous nib-wick members which may contain inks or dyes or other absorbent materials, particularly inks or dyes of varied colors, wherein each fibrous porous member 16A, 16B, 16C, 16'A, 16'B and 16'C is separated from an adjacent fibrous porous member, by a nib section barrier 22 or by a polymeric film or coating.

As best shown in FIGS. 1, 3A and 3B, in accordance with one nib embodiment, the multi-sectional nib 12 includes three nib sections 12A, 12B and 12C that are disposed adjacent to each other at a writing end 20 of the writing instrument 10 surrounding an ink-impermeable nib section barrier 22. The nib section barrier, in the preferred embodiment, is formed from an ink-impermeable polymeric material that is formed to include three ink-impermeable walls 22A, 22B and 22C extending from a common centerline C (FIG. 3A), separated by 120°, and having sufficient length and height to be coextensive with each nib section 12A, 12B and 12C. The nib section barrier 22 forms an ink-impermeable barrier between each nib section 12A, 12B and 12C, while allowing each nib section to contact a substrate, such as paper, to be marked by each nib section either separately or simultaneously, depending on the angle of the nib with respect to the substrate. Internally, within the barrel 14, at a barrel-internal longitudinal end 23 (FIG. 3A) of the nib section barrier 23, the nib sections 12A, 12B and 12C diverge from each other (see nib section portions 12A', 12B' and 12C') so as to be out of contact with each other so that nib section portions 12A', 12B' and 12C' do not require the nib section barrier 22 between each nib section portion 12A', 12B' and 12C' to prevent fluid exchange between the separated nib section portions 12A', 12B' and 12C'.

Each tri-sectioned nib 12 and 12' is held in longitudinal alignment with a longitudinal centerline of the cylindrical barrel 14 by a writing instrument ferrule 26 and 26', respectively, containing integral structure capable of holding each multi-sectioned nib 12 and 12' in position. Nib 12 extends outwardly from the ferrule 26 for writing or marking from any or all of the nib sections 12A, 12B and 12C and to hold the spaced opposite ends (non-writing ends) 12A', 12B' and 12C' of the nib sections 12A, 12B and 12C in fluid communication with fluid reservoirs 16A, 16B and 16C, respectively. Similarly, nib 12' extends outwardly from the ferrule 26' for writing or marking from any or all of the nib sections 12'A, 12'B and 12'C and to hold the spaced opposite ends 12'A', 12'B' and 12'C' (non-writing, reservoir-contained ends) of the nib sections 12'A, 12'B and 12'C in fluid communication with fluid reservoirs 16'A, 16'B and 16'C, respectively.

As best shown in FIGS. 3–5, each writing instrument ferrules 26, 26' includes a cylindrical barrel-telescoping structure 28 having a radially extending, annular stop surface 30 for fitting the cylindrical barrel-telescoping structure 28 of ferrules 26, 26' within the barrel 14 until stop surface 30 contacts the cylindrical barrel 14, as shown in FIG. 5. The ferrules 26, 26' also includes a cylindrical nib-receiving structure 32 for receiving the tri-sectioned nib 12 within the ferrule 26 at the writing ends 20 of the writing instrument 10 to allow each nib section 12A, 12B and 12C of the nib 12 to extend outwardly from the ferrule 26 for writing or marking purposes.

Opposite (non-writing) ends of each nib section 12A, 12B, 12C, 12'A, 12'B and 12'C are spaced from each other and disposed within the tubular barrel 14 such that each nib section is disposed in communication with a different fibrous porous member 16A, 16B, 16C, 16'A, 16'B or 16'C respectively.

The materials and construction of the marker or writing instrument components will now be explained in more detail.

Another important embodiment of a multi-sectioned nib 34 is shown in FIGS. 6–8. In accordance with this nib embodiment, each nib section 34A, 34B and 34C is individually wrapped around its outer, annular surface with a fluid-impervious polymeric film so that the wicking material encased therein is only exposed at its writing/marking end 35A, 35B or 35C, respectively, and at its opposite, fluid-receiving end, 36A, 36B or 36C, in fluid communication with a fluid-containing reservoir 16A, 16B or 16C. In accordance with this embodiment, the multiple nib sections 35A, 34B and 34C, facing 120° apart, with a tape or sleeve 38 holding the nib sections in contact with each other at the wrapping film material, e.g., films of ethylene, propylene or polyethylene terephthalate. The tape or sleeve 38 is disposed only near the writing/marking ends of the nib sections 35A, 34B and 34C to hold the writing/marking ends adjacent to each other and to permit the opposite, reservoir-contained ends to separate to provide spacing for insertion into the separate reservoirs 16A, 16B and 16C. The writing/marking ends 35A, 35B and 35C, together form a rounded or elliptical marking end consisting of the three ends of the exposed wicking material within each nib section 34A, 34B and 34C.

Reservoir

For delivery of small pigment particles, reservoirs containing a porous fibrous nib-wick structure with intermediate to open density is preferred. The reservoirs can contain porous fibrous nib-wick material of linear fibers or entangled fibers. In either case, the porous fibrous nib-wick structure contained in the reservoirs should have a density of about 0.5 gram/cc or below, preferably about 0.1 to about 0.5 gram/cc. The nib-wick fibers contained in the reservoirs preferably are made, for example, of polyester, nylon, polypropylene or any other processible polymeric material that is compatible with the ink or other material contained in the reservoir, as well known in the art. The fibers are wrapped within an ink-impermeable plastic wrap that can be made of polyester, nylon or polypropylene depending on its compatibility with the inks, or can be separated from adjacent reservoirs in any other manner, such as with polymeric barriers similar to the nib section barrier 22.

If larger particles (>5 microns) are contained within the porous fibrous nib-wick structures, the reservoirs 16A, 16B, 16C, 16'A, 16'B, 16'C, should contain a porous fibrous nib-wick structure having a relatively open structure. Reservoirs containing porous fibrous nib-wick structures having a density that is too high are not suitable for pigment particles larger than 5 µm since they produce a filtering effect on the pigment particles and thereby retain rather than release the pigment particles to the nib sections 12A, 12B, 12C, 12'A, 12'B and 12'C. Useful porous fibrous nib-wick structures for pigment particles larger than about 5 µm should have a fiber density lower than about 0.5 gram/cc, and more preferably lower than about 0.1 gram cc, e.g., 0.01 to about 0.09 gram/cc. The fibers can be made, for example, of polyester, nylon or a polyolefin, such as polypropylene. The fibers inside the reservoirs 16A, 16B, 16C, 16'A, 16'B and 16'C can be linearly oriented, or entangled. To maintain integrity of the reservoir when containing aggressive solvents, reservoir wraps made of polypropylene or nylon are preferred. The reservoir, and contained nib-wick, can be of any dimensions as long as the dimensions are appropriate for the amount of material, e.g., ink, delivered and can be fitted into the desired marker barrel 14.

Nibs

The preferred nibs 12 and 12' are each divided into three sections. Each section is isolated from the two adjacent sections by the fluid-impervious nib section barrier 22 (FIGS. 3, 3A and 3B) having integral partition walls 22A, 22B and 22C, each spaced by 120°. Each nib sector 12A, 12B and 12 include an integral, spaced lead 12A', 12B' and 12C' (FIG. 3B) to be connected to a separate, distinct reservoir 16A, 16B and 16C. The nib 12 should be porous enough to allow the free passage of the ink or other fluid and yet sufficiently dense to prevent leakage of the ink or other fluid when the marker 10 is held nib-down, such that gravity exerts a downward force on the ink or other fluid. Useful nibs should have a minimum porosity of about 50% for small particles (<5 microns) and a minimum porosity of about 60% for large particles (>5 microns), and preferably more than 65%, and even more preferably in excess of 68% for pigment particles larger than about 5 µm. The resin inside can be made of polyacetal, melamine or any resin that is not soluble in the solvent system chosen. The nib fiber can be made of materials such as polyester, polypropylene or nylon. The nib fiber should be compatible with the ink solvent or fluid solvent(s) and provide retention of the ink or other fluid left on the fibers.

Ink

The preferred ink should include an optional coloring agent; one or more solvents for the fluid being carried in the ink reservoir, preferably containing a water-miscible solvent; and optionally a solvent-soluble resin.

To prevent inter-bleeding, the coloring agent is preferably a pigment. Suitable pigments may include, and are not limited to organic pigments, inorganic pigments, and pigment precursors. Applicable organic pigments may include, but are not limited to, blue pigments such as Palomar Blue B-4810 PB 15:3, Palomar Blue B-4710 PB 15:1, and Palomar Blue B-4900 pigments (all available from Bayer Corp.); and Sunfast Blue 15:3 presscake and Sunfast Blue 15:3 powder (available from Sun Chemical Corp.) and alkaline blue pigment from (BASF). Suitable red pigments include, but are not limited to, magenta pigments such as Quindo Magenta RV-6828 Pigment Red 122, Quindo Magenta RV-6831 Pigment Red 122 presscake, Quindo Red R-6713 PV 19, and Quindo Magenta RV-6843 Pigment Red 202 pigments (all available from Bayer Corp.); and Sunfast Magenta 122 and fast Magenta 202 pigments (both available from Sun Chemical Corp.). Suitable yellow pigments include, but are not limited to, Fanchon Fast Y-5700 PY 139 and Fanchon Fast Yellow Y-5688 C.I. Pigment Yellow 150 pigments (available from Bayer Corp. of Rock Hill, S.C.); Sunbrite Yellow 14 presscake and Spectra Pac Yellow 83 pigments (both available from Sun Chemical Corp. of Cincinnati, Ohio); Sandorin Yellow 6GL (available from Clariant Corp. of Charlotte, N.C.); and Irgazin Yellow 2RLT PY 110, Irgazin Yellow 2GLTN PY 109, Irgazin Yellow 2GLTE PY 109, and Irgazin Yellow 3RLTN PY 110 pigments (all available from Ciba Geigy). Suitable green pigments include, but are not limited to, copper phthalocyanine green pigment like Pigment Green 1, Pigment Green 2, Pigment Green 7, and Pigment Green 36, and mixtures thereof. Violet colorant comprises a quinacridone or a benzimidazolone pigment. Violet colorants useful in the invention Pigment Violet 19, Pigment Violet 3, Pigment Violet 32, and Pigment Violet 23, and mixtures thereof. Orange colorant comprises a .beta.-naphthol pigment or a Naphthol Reds pigment. Orange colorants useful in the invention include Pigment Orange 5, Pigment Red 17, Pigment Red 188, Pigment Orange 62, Pigment Red 112, Pigment Red 255, Pigment Red 264, and Pigment Red 49:2, and mixtures thereof. The color may also include black pigments like carbon black, such as Special Black 4, Special Black 5, Special Black 6, Special Black 4A, Color Black FW 200, and Color Black FW2 pigments (all manufactured by Degussa Corporation of Ridgefield, N.J.); Raven 1200 carbon black, Raven 1170 carbon black, Raven 3500 carbon black, and Raven 5750 carbon black pigments (all available from Columbian Chemical Corp. of Atlanta, Ga.); Mogul L carbon black and Sterling NS carbon black pigments (both available from Cabot Corp. of Boston, Mass.); and Carbon Black MA-100 pigment (available from Mitsubishi Kasei Corp. of Tokyo, Japan).

Suitable inorganic pigments include, but are not limited to, white pigments such as titanium dioxide, zinc oxide, calcium carbonate, lead white (lead carbonate), barium sulfate; and blue pigment like iron blue, cobalt blue, ultramarine blue; black pigment like black iron oxide (Iron (II, III) oxide), logwood; brown pigments like brown iron oxide and ochre; red pigments like Cadmium Red, red iron oxide; yellow pigments like Cadmium Yellow (CdS, CdZnS), Curcuma Yellow, yellow iron oxide, Yellow Chrome Lead chromium, green pigments like Green Chromate Oxide, Malachite, ferrocyanides, ferricyanides, violet pigments like Manganese Violet (manganese ammonium pyrophosphate), various aluminum salts and so on. Pigment precursors like those described in U.S. Pat. No. 6,524,382 are also applicable in this application.

Such pigments can be added into the formulation as a dried powder, pigment concentrate chips, granules or a pre-dispersed paste.

To enhance the color effect of the colorant, the pigment should not be too small. The pigment should be at least about 0.05 micron in one of its dimensions, more preferably at least about 0.2 micron, and most preferably at least about 1 micron. Larger particles tend to be retained on the surface of the porous fibrous structures, and result in enhanced opacity.

To achieve such pigment particle size, it is desirable to add the pigment in the form of a dried powder or a press-cake. Representative commercial pigments that can be used in the form of a water wet presscake include: Heucophthal.RTM. Blue BT-585-P, Toluidine Red Y (C.I. Pigment Red 3), Quindo.RTM. Magenta (Pigment Red 122), Magenta RV-6831 presscake (Mobay Chemical, Harmon Division, Haledon, N.J.), Sunfast.RTM. Magenta 122 (Sun Chemical Corp., Cincinnati, Ohio), Indo.RTM. Brilliant Scarlet (Pigment Red 123, C.I. No. 71145), Toluidine Red B (C.I. Pigment Red 3), Watchung.RTM. Red B (C.I. Pigment Red 48), Permanent Rubine F6B13-1731 (Pigment Red 184), Hansa.RTM. Yellow (Pigment Yellow 98), Dalamar. RTM. Yellow YT-839-P (Pigment Yellow 74, C.I. No. 11741, Sunbrite.RTM. Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc.

Other applicable colorants also include dye-filled microspheres. These are spheres made with an organic polymer and filled with a dye solution. An example is a green color microsphere particle supplied by Radiant Company (CA).

Another possibility for pigment will be glittering-appearance particles. Any particles that deliver a glittery appearance may be used. These include, but are not limited to aluminum pigments, gold pigments, dual color pigments (DuoChrome), holographic pigments, "glitter" pigments, metallic pigments (protected metal particles like gold, copper, nickel, silver, platinum and so on), interference pigments, and other pigments known in the art. These pigments are available from metallic pigment manufacturers like US Aluminum and MD-Both (West Chicago, Ill.)

As mentioned, only particles greater than a certain diameter or size will be able to deliver a significant glittery effect. As a result, preferred metallic particles should be at least about 12.1 microns in at least one of its dimensions, and preferably at least about 20 microns, and more preferably at least about 30 microns in at least one of its dimensions. In general, the glittering effect is directly proportional to the size of the metallic pigment. The glittering effect will become more prominent when the size of the metallic pigment increases. A suitable pigment is an aluminum flake supplied by MD-Both Pigment Company (West Chicago, Ill.).

To add to the effect of one or more metallic pigments, a coloring agent can be added to the colorant composition. The coloring agent can be a water-soluble dye or a pigment (either dry or in a dispersion). For a labile or temporary mark, a water-soluble dye can be used. For a more permanent mark, a water non-soluble pigment or a polymeric dye or a encapsulated dye (microsphere) can be used. Suitable dyes include, but are not limited to, anionic and cationic dyes. Those dyes can be Basic, Acid, Direct, and/or Reactive dyes. Examples of suitable dyes include, but are not limited to, Food Black No. 1, Food Black No. 2, Food Red No. 40, Food Blue No. 1, Food Yellow No. 7, and the like; FD & C dyes; Acid Black dyes (No. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 227, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes, monoazo dyes, disazo dyes, phthalocyanine derivatives, including various phthalocyanine sulfonate salts, aza annulenes, formazan copper complexes, triphenodioxazines, Bernacid Red 2BMN; Pontamine Brilliant Bond Blue A; Pontamine; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Direct Brilliant Pink B Ground Crude, available from Crompton & Knowles; Cartasol Yellow GTF Presscake, available from Sandoz, Inc.; Cartasol Yellow GTF Liquid Special 110, available from Sandoz, Inc.; Yellow Shade 16948, available from Tricon, Basacid Black X34 (BASF X-34), available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bemacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; various Reactive dyes, including Reactive Black dyes, Reactive Blue dyes, Reactive Red dyes including Reactive red 180, and the like, Reactive Yellow dyes including Reactive yellow 37, as well as mixtures thereof.

Polymeric dyes also are suitable for delivery by the marker/writing instruments described herein. Representative examples include, but are not limited to, those colors produced by Milliken Corporation (Spartanburg, S.C.) in the Palmer dye product line. One example (see U.S. Pat. No. 4,981,516) is an aqueous mixture containing water soluble, ester-terminated, poly(alkyleneoxy)-substituted methane colorant of the formula:

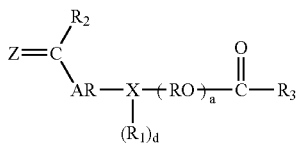

wherein: AR is an unsubstituted or substituted aromatic or hetero-aromatic group; X is nitrogen or oxygen; R is unsubstituted or substituted straight or branched alkylene of 2–4 carbons or mixtures thereof; $R_1$ is H or an unsubstituted or substituted alkyl, cycloalkyl or phenyl moiety containing one to about 10 carbons, or a group of the formula:

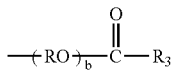

wherein: $R_3$ is H or alkyl of one to about ten carbons, and d is zero when X is oxygen and one when X is nitrogen; $R_2$ is hydrogen or alkyl of one to about five carbons; a and b are each an integer independently selected from one to about forth wherein a+b is an integer of from about 6 to about 80; and Z is a divalent vinylic carbon atom which is covalently bonded to a group or moiety including any of cyano, vinyl carbon, sulfide, sulfoxide, sulfone, allylic oxygen, thiocyano, or carbonyl which is not part of an amide, carboxylic acid or carboxylic acid salt moiety.

Another example (see U.S. Pat. No. 5,043,013) is a washable aqueous ink composition having a viscosity of form about 1.0 to about 6.0 centipoises and containing from about 10 to about 50% by weight of one or more polymeric colorants of the formula:

$\{R_1[(RO)_a-Y]_b\}_c$ wherein:
X is a polar group such as sulfonic acids, sulfonic acid salts, sulfonamides, sulfonates or the like;
R is alkylene; Y is H, alkanoyl, carbamoyl, or the like;
$R_1$ is nitrogen, oxygen, sulfur, or a sulfur-containing divalent linking group;
a is an integer of from six to about forty;
b and c are each independently selected from one or two;
d is an integer of from one to four; the product of (a) (b) (c) is an integer of from 6 to about 40; and
CHROM is a chromophore such as nitro, nitroso, monoaxo, disazo and trisazo, diarylmethane, triarylmethane, xanthane, acridine, methane, thiazole, indamine, azine, oxazine, or anthraquinone, wherein the $(RO)_a$ moiety is bonded to a carbocyclic aromatic ring of the (CHROM) through $R_1$.

Another example (see U.S. Pat. No. 5,059,244) is an aqueous solution of a chromophore having at least one sulfonic acid or carboxylic acid functionality and a triethanolamine ethoxylate is provided for a fugitive colorant useful in ink formulations or to temporarily tint textile fibers. Preferably the triethanolamine ethoxylate contains at least nine moles of —$CH_2CH_2O$— units and is present in a molar excess per acid functionality of the chromophore.

Solvent

To deliver inks containing pigment particles or other solid particles, it is desirable to include in the formulation a heteroatom-bearing co-solvent. The hetero-atom can be nitrogen and sulfur besides oxygen. Suitable solvents include, but are not limited to, formamide, morpholine, 2-pyrrolidine, N-methylpyrrolidinone, dimethylacetamide, dimethylformamide, dimethylsulfoxide, propylene glycol, glycol ethers and so on. The percentage of the co-solvent should be from about 0.1% to about 99.9% by weight, and preferably from about 0.1% to about 50% by weight, and more preferably from about 0.1% to about 30% by weight.

Resin

In the preferred embodiment, the ink also contains a resin. The resin that can be used depends on the final application. If a temporary marker is desired, a water soluble-resoluble resin can be used. Suitable resins include, but are not limited to, low molecular polysaccharides, such as a hydroxyethylcellulose, carboxymethylcellulose, hydroxypropylcellulose, derivatized chitin, derivatized starch, carrageenan, and pullulan; DNA, proteins, poly(styrenesulfonic acid), poly(styrene-co-maleic anhydride), poly(alkyl vinyl ether-co-maleic anhydride), polyacrylamide, partially hydrolyzed polyacrylamide, poly(acrylic acid), poly(vinyl alcohol), partially hydrolyzed poly(vinyl acetate), poly(hydroxyethyl acrylate), poly(methyl vinyl ether), polyvinylpyrrolidone, poly (2-vinylpyridine), poly(4-vinylpyridine), poly(diallyldimethylammonium chloride) and the like.

If a dry-erase formulation is desired, an example of a yellow metallic color is as follows:

| Component | Function | wt % |
|---|---|---|
| Water | Solvent | 31.94 |
| IPA | co-solvent | 17.1 |
| DEP 10% IPA | Surfactant | 1.14 |
| Chemphos 10% IPA | Surfactant | 1.14 |
| Silwet L7607 | Release agent | 5.84 |
| Surfynol 440 | Surfactant | 3.42 |
| Glycerine | Humectant | 1.14 |
| Rite Brite Br Base | Dry erase water soluble resin (Class 55 Cotton Sottner) | 28.52 |
| 7160 nl NW (60%) | Metallic pigment | 3.76 |
| Palmer Yellow | Washable colorant | 5.97 |
| | | 100 |

However, if the desired application is a permanent marker, a resin that will not re-solubilize after drying should be used. An important class of resins for this purpose includes polyacrylic acid and its co-polymers that contain labile cations, such as ammonium cations. When the resin is dried and the ammonia gas evaporates from the dried film, the film will become water-insoluble. An example of this resin is NeoCryl A1110 (NeoResin, NJ). Another class of resins suitable for use as a permanent marker includes self-crosslinking resins available from Union Carbide Corporation (Uce5000). The self-crosslinking resins are usually cured when exposed to air (by oxidation) and/or humidity (by moisture).

For whatever the desired application, it is understood that the concentration of resin added should be such that the final ink exhibits desirable physical properties of viscosity and pH. For most applications, the amount of resin used will be less than 90% by weight, and more preferably less than 50% by weight, and more preferably less than 30% by weight, e.g.,—to 25% by weight.

The viscosity of the inks, at 25° C., is usually less than about 20 cps (centipoises), preferably from about 1 cp to about 10 cps, and more preferably from about 1 cp to about 5 cps. However, this range can be drastically shifted depending on the nature and porosity of the nib and reservoir used in the marker system.

The ink may optionally contain other additives such as biocide(s), surface tension modifier(s), other resin(s), surfactant(s), humectant(s), viscosity modifier(s), and/or other additives known in the art. These additives can be added in an amount such that the overall performance of the ink is not adversely affected, e.g., 0.1 to 5% by weight.

The following examples may help illustrate the usefulness of the marker/writing instruments described herein with the understanding that the particular materials disclosed therein should in no way be construed to limit the scope and spirit of useful materials capable of being delivered by the marker/writing instruments described.

EXAMPLE 1

Green Color Pigmented Ink 14.93 parts of Orasperse Green CYB 136 (Organic Pigment Corporation, Greensboro, N.C.), 19.9 parts of Formamide, 64.6 parts of DI water, 0.4 parts of Surfynol 2502 (Air Products, Allentown, Pa.) and 0.09 parts of Surfynol DF-75 (Air Products, Allentown, Pa.) were mixed for thirty minutes.

EXAMPLE 2

Red Color Pigmented Ink

Procedures in Example 1 were followed except that the green pigment dispersion was replaced by Orasperse Red 018 (Organic Pigment Corporation, Greensboro, S.C.).

EXAMPLE 3

Yellow Color Pigmented Ink

Procedures in Example 1 were followed except that the green pigment dispersion was replaced by Orapad Yellow 3RM 2051 S (Organic Pigment Corporation, Greensboro, S.C.).

EXAMPLE 4

Marker Manufacturing

Three inks described in Example 1–3 were injected (0.7 grams per reservoir) into three separate reservoirs. Each reservoir was connected to one sector of a tri-sectored nib (PW505 SP, Aubex Corporation, Chiba, Japan). The whole assembly was put into a ferrule and inserted into one end of the marker barrel. The process was repeated with three different colors on the other side of the barrel.

Though examples containing pigmented inks are described above, it is understood that other types of liquids and emulsions can be used in place of the pigmented inks. For instance, metallic inks, such as those supplied by National Ink Company (CA) can be used in place of the pigmented inks. Other suitable inks include water-based dry erase inks supplied by Sanford Corporation (Sherbyvilles, Tenn.), and pigmented highlighter inks supplied by Fuji Pigment Dispersion (Japan).

Since there are three separate reservoirs connecting to a single, segmented nib, more than one ink type can be used with the same nib. For instance, one sector, e.g., 12A, of the nib 12 can be used to deliver a dry erase ink; another sector, e.g., 12B, to deliver a highlighter ink; and the last sector, e.g., 12C, to deliver a permanent ink.

The invention claimed is:

1. A writing instrument, comprising
   a tubular, ink-impermeable body portion containing a plurality of reservoirs that are housed adjacent to each other such that each reservoir is separated from an adjacent reservoir by a reservoir barrier;
   a multi-sectioned nib disposed at one end of the writing instrument, said multi-sectioned nib comprising a plurality of nib sections disposed adjacent to each other, each nib section including a curved marking surface that mates with a curved marking surface of an adjacent nib section to form a continuously curved nib marking end, wherein each nib section is separated from an adjacent nib section by a nib section barrier, the nib sections being secured to each other, and separated by said nib section barrier to form the continuously curved marking end, such that the nib sections do not communicate materials contained therein between adjacent nib sections, and
   wherein opposite ends of the nib sections are spaced from each other and disposed within the tubular body portion such that each nib section is disposed in communication with a different reservoir.

2. A writing instrument in accordance with claim 1, wherein each end of the writing instrument includes a multi-sectioned nib, wherein each nib section is in fluid communication with a separate reservoir.

3. A writing instrument in accordance with claim 2, wherein each end of the writing instrument includes a nib comprising three nib sections, wherein the nib sections are in fluid communication with separate reservoirs such that the writing instrument has the capability of writing in multiple colors.

* * * * *